(12) United States Patent
Zhu et al.

(10) Patent No.: US 9,059,558 B2
(45) Date of Patent: Jun. 16, 2015

(54) LASER

(71) Applicants: Tsinghua University, Beijing (CN); HON HAI PRECISION INDUSTRY CO., LTD., New Taipei (TW)

(72) Inventors: Jing-Lei Zhu, Beijing (CN); Jun Zhu, Beijing (CN); Qun-Qing Li, Beijing (CN); Kai-Li Jiang, Beijing (CN); Chen Feng, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 191 days.

(21) Appl. No.: 14/137,185

(22) Filed: Dec. 20, 2013

(65) Prior Publication Data

US 2014/0294033 A1 Oct. 2, 2014

(30) Foreign Application Priority Data

Dec. 26, 2012 (CN) .......................... 2012 1 0573848

(51) Int. Cl.
| | |
|---|---|
| *H01S 3/03* | (2006.01) |
| *H01S 3/08* | (2006.01) |
| *H01S 3/223* | (2006.01) |
| *H01S 3/092* | (2006.01) |
| *H01S 3/04* | (2006.01) |
| *H01S 3/041* | (2006.01) |
| *H01S 3/22* | (2006.01) |

(52) U.S. Cl.
CPC .............. *H01S 3/08068* (2013.01); *H01S 3/03* (2013.01); *H01S 3/08059* (2013.01); *H01S 3/092* (2013.01); *H01S 3/2232* (2013.01); *H01S 3/0407* (2013.01); *H01S 3/041* (2013.01); *H01S 3/2222* (2013.01)

(58) Field of Classification Search
CPC .... H01S 3/03; H01S 3/08059; H01S 3/08068
USPC ................................. 372/55, 61, 92, 99, 101
See application file for complete search history.

(56) References Cited

U.S. PATENT DOCUMENTS

2002/0105993 A1* 8/2002 Tang ............................... 372/55
2009/0110021 A1* 4/2009 Conway et al. ............... 372/102

* cited by examiner

*Primary Examiner* — Armando Rodriguez
(74) *Attorney, Agent, or Firm* — Novak Druce Connolly Bove + Quigg LLP

(57) ABSTRACT

A laser includes a total reflective mirror, an output mirror, a discharge lamp, and an active laser medium. The total reflective mirror, the output mirror, and the discharge lamp define a resonant cavity. The active laser medium is filled in the resonant cavity. The total reflective mirror includes a body, a metal film, and at least one microstructure. Each of the at least one microstructure is a step structure. The step structure includes a plurality of cylinders stacked with each other with respect to their diameters. Both the height and the diameter of the cylinders are in a range from about $0.5\lambda$ to about $2\lambda$, while $\lambda$ is a working wavelength of the laser.

20 Claims, 8 Drawing Sheets

LASER

CROSS-REFERENCE TO RELATED APPLICATIONS

This application claims all benefits accruing under 35 U.S.C. §119 from China Patent Application No. 201210573848.4, filed on Dec. 26, 2012 in the China Intellectual Property Office. This application is also related to application entitled, "LASER", filed Dec. 20, 2013 Ser. No. 14/137,236, "LASER", filed Dec. 20, 2013 Ser. No. 14/137,219, "LASER", filed Dec. 20, 2013 Ser. No. 14/137,197, and "LASER", filed Dec. 20, 2013 Ser. No. 14/137,248. Disclosures of the above-identified applications are incorporated herein by reference.

BACKGROUND

1. Technical Field

The present disclosure relates to lasers.

2. Description of Related Art

Because of the high power levels available, a variety of lasers are frequently used in industrial applications such as cutting and welding, and in military applications such as laser weapons.

Most of the high power lasers are multi-mode lasers, and the laser beams have large divergence angle, shallow depth of focus, low stability, and high power density loss during long distance transmission.

What is needed, therefore, is to provide a laser in which the laser beam has small divergence angle, small spot size, long depth of focus, and low power density loss during long distance transmission.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
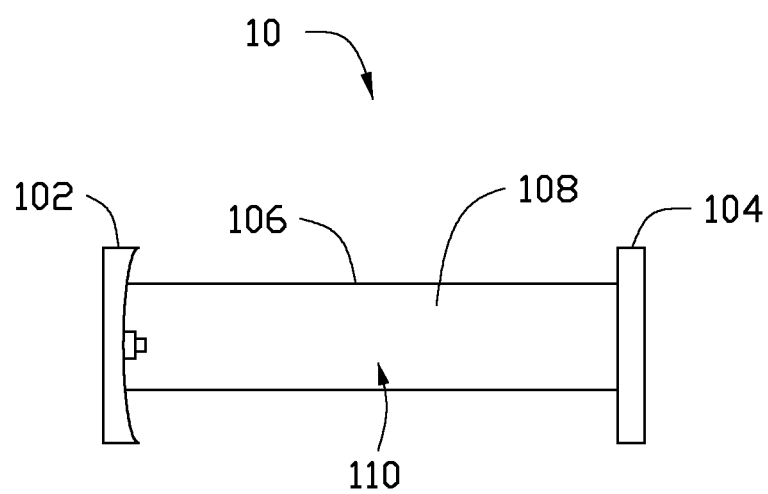
FIG. 1 is a schematic diagram of a laser according to one embodiment.

FIG. 1 is an embodiment of a laser 10. The laser 10 includes a total reflective mirror 102, an output mirror 104, a discharge lamp 106, and an active laser medium 108. The total reflective mirror 102 and the output mirror 104 are separately configured on two opposite ends of the discharge lamp 106. The total reflective mirror 102, the output mirror 104, and the discharge lamp 106 define a resonant cavity 110. The active laser medium 108 is filled in the resonant cavity 110.

Similar to some prior art, the laser 10 further includes two electrodes, a water-cooled jacket, a water inlet, a water outlet, a gas reservoir, a gas tube, and other components (not shown in FIG. 1).

Figure 2:
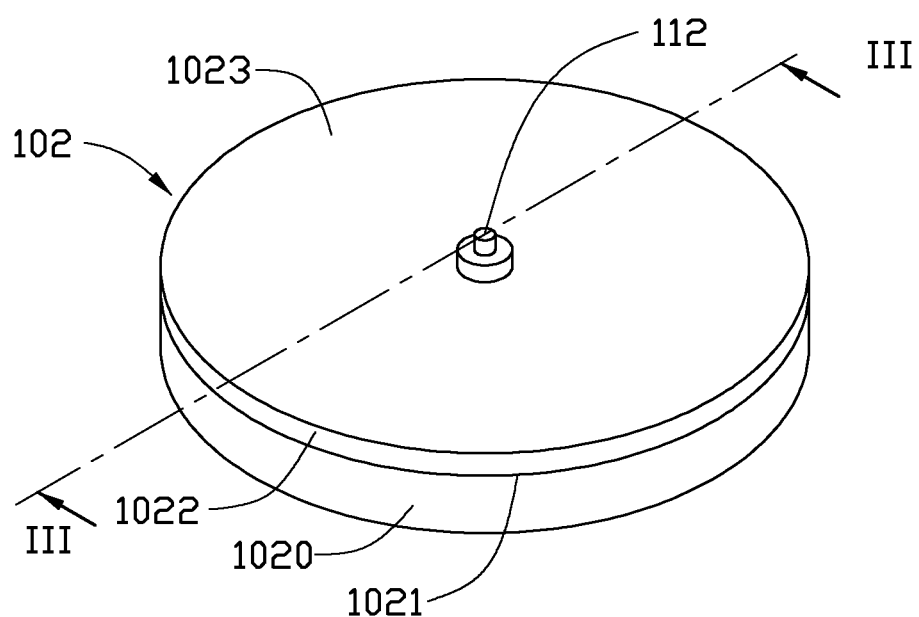
FIG. 2 is a schematic diagram of a total reflective mirror in the laser of FIG. 1.

FIG. 2 shows that the total reflective mirror 102 is a spherical mirror having a curvature radius ranging from about 0.5 meters to about 5 meters. In one embodiment, the curvature radius of the total reflective mirror 102 is 1.5 meters.

The total reflective mirror 102 includes a body 1020 defining a first reflective surface 1021, and a metal film 1022 coated on the first reflective surface 1021 of the body 1020. The metal film 1022 has a second reflective surface 1023, which faces the output mirror 104. The total reflective mirror 102 further includes a microstructure 112.

The body 1020 is made of a nonmetal which is not easy to deform under heating, such as silicon, silicon oxide, and silicon carbide. In one embodiment, the body 1020 is made of silicon. The body 1020 has a diameter ranging from about 5 millimeters to about 50 millimeters. In one embodiment, the body 1020 has a diameter of 20 millimeters. The body 1020 has a thickness ranging from about 2 millimeters to about 20 millimeters. In one embodiment, the body 1020 has a thickness of 5 millimeters.

The metal film 1022 is made of a metal which has high melting point, it is difficult to be oxidized, and can produce surface plasma. In one embodiment, gold is used to make the metal film 1022. The metal film 1022 has a thickness which is greater than its skin depth. In one embodiment, the thickness of the metal film 1022 is greater than 50 nanometers. The metal film 1022 can be coated onto the first reflective surface 1021 of the body 1020 by electroplating, depositing, sputtering, spraying, or any other coating methods.

Figure 3:
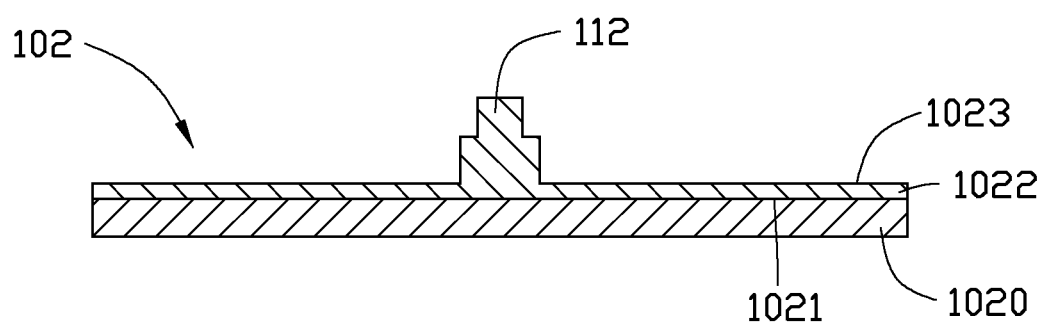
FIG. 3 is a cross-sectional view of the total reflective mirror of FIG. 2 according to one embodiment.

FIG. 3 shows that in one embodiment, the microstructure 112 protrudes from the second reflective surface 1023 of the metal film 1022. The microstructure 112 can be formed on the second reflective surface 1023 by electroplating, depositing, sputtering, spraying, or any other coating methods with the aid of a mask. In one embodiment, the microstructure 112 and the metal film 1022 are formed as one piece.

Figure 4:
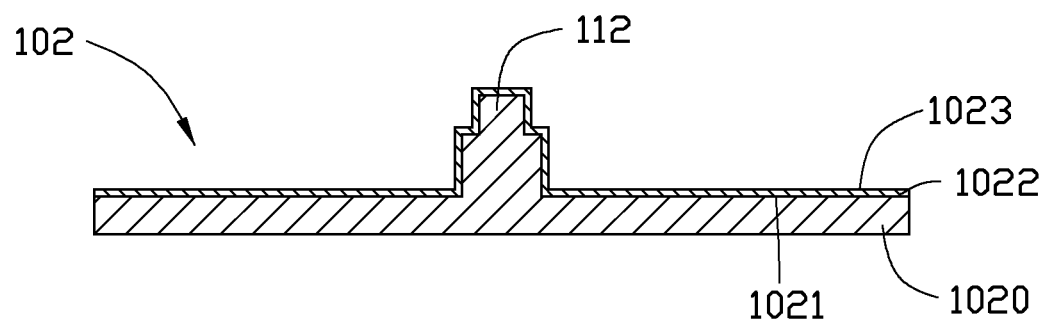
FIG. 4 is a cross-sectional view of the total reflective mirror of FIG. 2 according to another embodiment.

FIG. 4 shows that in another embodiment, the microstructure 112 protrudes from the first reflective surface 1021 of the body 1020. The metal film 1022 covers both the first reflective surface 1021 and the microstructure 112. The microstructure 112 is located close to a center of the first reflective surface 1021. In one embodiment, the microstructure 112 is located on the center of the first reflective surface 1021. The material for the microstructure 112 is the same as that of the body 1020. The microstructure 112 can be formed by etching the body 1020 with the aid of a mask. In one embodiment, the microstructure 112 and the body 1020 are formed as one piece.

The microstructure 112 is step structure. The step structure includes a plurality of cylinders stacked with each other in series with respect to their diameters.

A height of the microstructure 112 is a sum of heights of the plurality of cylinders. Each of the plurality of cylinders in the microstructure 112 has a height ranging from about $0.5\lambda$ to about $2\lambda$, wherein $\lambda$ is the working wavelength of the laser 10. The plurality of cylinders can have a same height. In one embodiment, the same height is $0.5\lambda$. In another embodiment, the same height is $\lambda$. The plurality of cylinders can also have different heights. A height of the microstructure 112 is in a range from about $\lambda$ to about $6\lambda$. In one embodiment, the microstructure 112 includes two cylinders stacked together, and both of the two cylinders have a height of $0.5\lambda$. Thus, the microstructure 112 has a height of $\lambda$. The working wavelength of the laser 10 is determined by the active laser medium 108. In one embodiment, the active laser medium 108 is carbon dioxide ($CO_2$), and the working wavelength $\lambda$ is 10.6 micrometers. Therefore, the height of the microstructure 112 is in a range from about 10.6 micrometers to about 63.6 micrometers. In one embodiment, the height of the microstructure 112 is 10.6 micrometers.

While the microstructure 112 includes two cylinders stacked together, and both of the two cylinders have a height of $0.5\lambda$, then the laser beam obtained by the laser 10 will have a relatively small divergence angle and spot size.

The microstructure 112 is a step structure, so it has different diameters in each step. Each step corresponds to each cylinder in the microstructure 112. Therefore, the diameter of each step is the diameter of each corresponding cylinder. Each cylinder in the microstructure 112 has a diameter ranging from about $0.5\lambda$ to about $2\lambda$. While each cylinder in the microstructure 112 has a diameter ranging from about $0.5\lambda$ to about $2\lambda$, a laser beam obtained by the laser 10 can have a relatively small spot size and a relatively low power density loss during long distance transmission. In one embodiment, the microstructure 112 includes two cylinders stacked together, wherein one cylinder has a diameter of $0.5\lambda$, and another one has a diameter of $\lambda$. In another embodiment, the microstructure 112 includes three cylinders stacked together, wherein the first hole has a diameter of $0.5\lambda$, the second one has a diameter of $\lambda$, and the third one has a diameter of $1.5\lambda$.

While the height and the diameter in each step of the microstructure 112 are all in a range from about $0.5\lambda$ to about $2\lambda$, then the laser beam obtained by the laser 10 will have a relatively small divergence angle and spot size, and will have a relatively low power density loss during long distance transmission.

The output mirror 104 is a flat mirror. A diameter can be same as the body 1020 of the total reflective mirror 102. In one embodiment, the diameter of the output mirror 104 is 20 millimeters. The output mirror 104 is a partial reflective mirror. A reflectivity of the output mirror 104 ranges from about 25% to about 55%. The output mirror 104 is made of germanium, zinc selenide, or gallium arsenide. In one embodiment, the output mirror 104 is made of zinc selenide.

The discharge lamp 106 is a quartz glass tube. The discharge lamp 106 has a diameter smaller than that of the output mirror 104. In one embodiment, the diameter of the discharge lamp 106 is in a range from about 2 millimeters to about 10 millimeters. In another embodiment, the diameter of the discharge lamp 106 is in a range from about 5 millimeters to about 6 millimeters.

The active laser medium 108 can be gas, such as $CO_2$, helium (He), neon (Ne), nitrogen ($N_2$), and carbon oxide (CO). The active laser medium 108 can also be solid, liquid, or semi-conductor. In one embodiment, the active laser medium 108 is $CO_2$.

The resonant cavity 110 has a length of about 400 millimeters to about 800 millimeters. In one embodiment, the length of the resonant cavity 110 ranges from about 500 millimeters to about 600 millimeters. In another embodiment, the length of the resonant cavity 110 is 600 millimeters.

Figure 5:
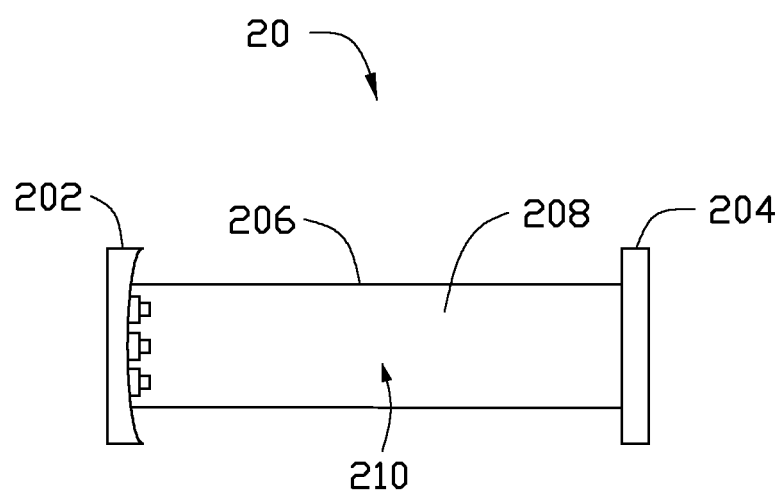
FIG. 5 is a schematic diagram of a laser according to another embodiment.

FIG. 5 shows that a laser 20 of another embodiment includes a total reflective mirror 202, an output mirror 204, a discharge lamp 206, and an active laser medium 208. The total reflective mirror 202 and the output mirror 204 are separately configured on two opposite ends of the discharge lamp 206. The total reflective mirror 202, the output mirror 204, and the discharge lamp 206 define a resonant cavity 210. The active laser medium 208 is filled in the resonant cavity 210.

Figure 6:
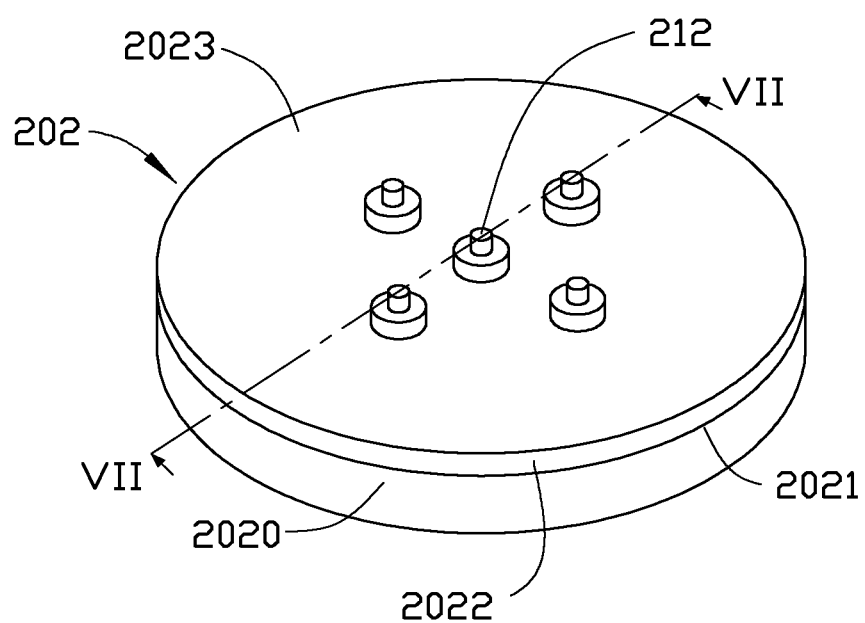
FIG. 6 is a schematic diagram of a total reflective mirror in the laser of FIG. 5.

FIG. 6 shows that the total reflective mirror 202 includes a body 2020 defining a first reflective surface 2021, and a metal film 2022 coated on the first reflective surface 2021 of the body 2020. The metal film 2022 has a second reflective surface 2023, which faces the output mirror 204. Different from the laser 10, the total reflective mirror 202 further includes a plurality of microstructures 212. The plurality of microstructures 212 forms an array.

Figure 7:
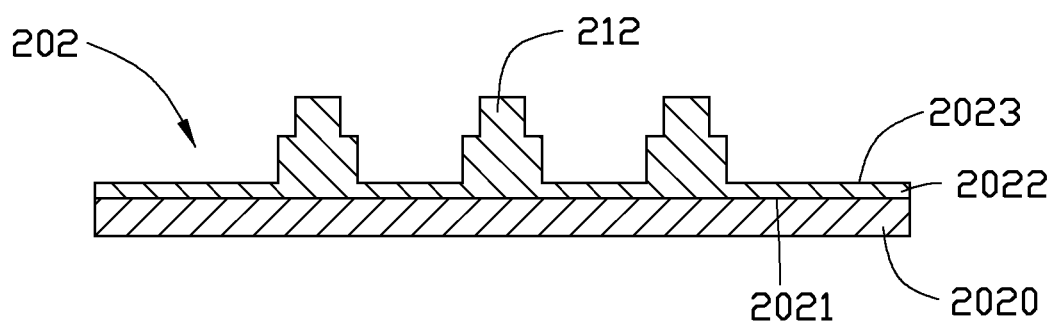
FIG. 7 is a cross-sectional view of the total reflective mirror of FIG. 6 according to one embodiment.

FIG. 7 shows that in one embodiment, the plurality of microstructures 212 protrudes from the second reflective surface 2023 of the metal film 2022. The plurality of microstructures 212 is located close to a center of the second reflective surface 2023. In one embodiment, one of the microstructures 212 is located on the center of the second reflective surface 2023, while the others are symmetrically distributed around the first one. The material for the plurality of microstructures 212 is the same as that of the metal film 2022. The plurality of microstructures 212 can be formed on the second reflective surface 2023 by electroplating, depositing, sputtering, spraying, or any other coating methods with the aid of a mask. In one embodiment, the plurality of microstructures 212 and the metal film 2022 are formed as one piece.

Figure 8:
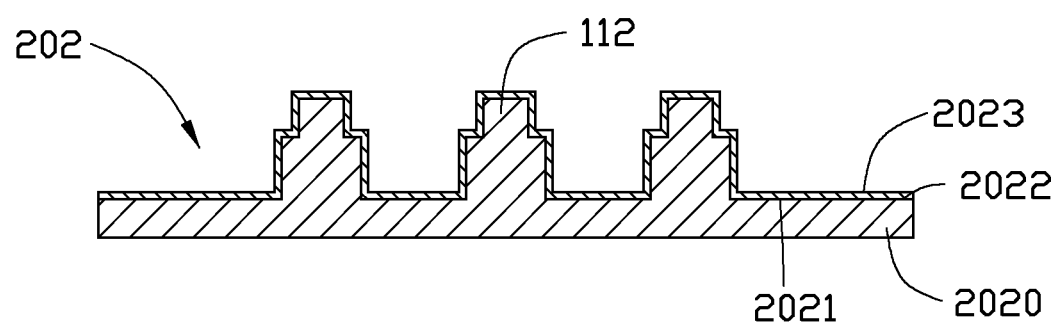
FIG. 8 is a cross-sectional view of the total reflective mirror of FIG. 6 according to another embodiment.

FIG. 8 shows that in another embodiment, the plurality of microstructures 212 protrudes from the first reflective surface 2021 of the body 2020. The metal film 2022 covers both the first reflective surface 2021 and the plurality of microstructures 212. The plurality of microstructures 212 is located close to a center of the first reflective surface 2021. In one embodiment, one of the microstructures 212 is located on the center of the first reflective surface 2021, while the microstructures 212 are symmetrically distributed around the first one. The material for the plurality of microstructures 212 is the same as that of the body 2020. The plurality of microstructures 212 can be formed by etching the body 2020 with the aid of a mask. In one embodiment, the plurality of microstructures 212 and the body 2020 are formed as one piece.

Each of the plurality of microstructures 212 is a step structure. The step structure includes a plurality of cylinders stacked with each other in series with respect to their diameters.

The shape, structure, and size of the microstructure 212 are all the same as that of the microstructure 112.

There is an interval between each two adjacent microstructures 212. Each interval has a size ranging from about $0.5\lambda$ to about $2\lambda$. In one embodiment, each interval has a same size. In another embodiment, the same size of all the intervals is $\lambda$. When the active laser medium 208 is $CO_2$, each interval has a size ranging from about 5.3 micrometers to about 21.2 micrometers.

The other components of the laser 20 are all the same as that of the laser 10.

Compared with the laser 10 having one microstructure 112, the laser 20 has a plurality of microstructures 212; additionally, each interval between each two adjacent microstructures 212 has a size ranging from about $0.5\lambda$, to about $2\lambda$, therefore, the surface plasma resonance produced in the resonant cavity 210 is more remarkable. A laser beam which has a long depth of focus, and low power density loss during long distance transmission can then be obtained.

The laser beam obtained by the laser 10 or 20 in present disclosure has a high quality beam, a long depth of focus, and a high power density in the beam center. Therefore, the laser beam can be easily applied in cutting or welding, especially in long distance transmission or commutation.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A laser comprising:
    a total reflective mirror comprising a body defining a first reflective surface, a metal film coated on the first reflective surface, and at least one microstructure; wherein each of the at least one microstructure comprises a plurality of cylinders having different diameters, the plurality of cylinders are stacked with each other in series with respect to the diameters, the metal film has a second reflective surface and the at least one microstructure protrudes from the second reflective surface, and the at least one microstructure and the metal film are made of a same material and formed as one piece;
    an output mirror,
    a discharge lamp, wherein the total reflective mirror and the output mirror are located on two opposite ends of the discharge lamp; and
    an active laser medium;
    wherein the total reflective mirror, the output mirror, and the discharge lamp define a resonant cavity, and the active laser medium is filled in the resonant cavity.

2. The laser as claimed in claim 1, wherein the at least one microstructure protrudes from the first reflective surface.

3. The laser as claimed in claim 2, wherein the at least one microstructure and the body are made of a same material and formed as one piece.

4. The laser as claimed in claim 1, wherein the laser has a working wavelength $\lambda$, and each of the at least one microstructure has a height ranging from about $\lambda$ to about $6\lambda$.

5. The laser as claimed in claim 1, wherein each of the plurality of cylinders has a height ranging from about $0.5\lambda$ to about $2\lambda$.

6. The laser as claimed in claim 1, each of the plurality of cylinders has a same height.

7. The laser as claimed in claim 6, wherein each of the at least one microstructure comprises two cylinders stacked with each other, and both of the two cylinders have a height of $0.5\lambda$.

8. The laser as claimed in claim 1, wherein the diameters of all the plurality of cylinders are in a range from about $0.5\lambda$ to about $2\lambda$.

9. The laser as claimed in claim 8, wherein each of the at least one microstructure comprises two cylinders stacked with each other, one of the two cylinders has a diameter of $0.5\lambda$, and the other of the two cylinders has a diameter of $\lambda$.

10. The laser as claimed in claim 1, wherein the total reflective mirror comprises a plurality of microstructures.

11. The laser as claimed in claim 10, wherein an interval is defined between each two microstructures, and each interval has a size ranging from about $0.5\lambda$ to about $2\lambda$.

12. The laser as claimed in claim 11, wherein the intervals has a same size of $\lambda$.

13. The laser as claimed in claim 1, wherein the active laser medium is selected from the group consisting of carbon dioxide, helium, neon, nitrogen, and carbon oxide.

14. The laser as claimed in claim 1, wherein the at least one microstructure is located close to a center of the first reflective surface.

15. A laser comprising:
    a total reflective mirror comprising a body defining a first reflective surface, a metal film coated on the first reflective surface, and a plurality of microstructures protruding from the first reflective surface, wherein each of the plurality of microstructures comprises a plurality of cylinders having different diameters, the plurality of cylinders are stacked with each other in series with respect to the diameters, the metal film has a second reflective surface and the plurality of microstructures protrude from the second reflective surface, and the plurality of microstructures and the metal film are made of a same material and formed as one piece;
    an output mirror,
    a discharge lamp, wherein the total reflective mirror and the output mirror are located on two opposite ends of the discharge lamp; and
    an active laser medium;
    wherein the total reflective mirror, the output mirror, and the discharge lamp define a resonant cavity, and the active laser medium is filled in the resonant cavity.

16. The laser as claimed in claim 15, wherein the active laser medium is carbon dioxide.

17. The laser as claimed in claim 16, wherein each of the plurality of cylinders has a height ranging from about 5.3 micrometers to about 21.2 micrometers.

18. The laser as claimed in claim 16, wherein each of the plurality of cylinders has a diameter ranging from about 5.3 micrometers to about 21.2 micrometers.

19. A laser comprising:
    a total reflective mirror comprising a body defining a first reflective surface, a metal film coated on the first reflective surface, and at least one microstructure; wherein each of the at least one microstructure comprises a plurality of cylinders having different diameters, the plurality of cylinders are stacked with each other in series with respect to the diameters, one of the at least one microstructure is located at the center of the total reflective mirror;
    an output mirror,
    a discharge lamp, wherein the total reflective mirror and the output mirror are located on two opposite ends of the discharge lamp; and
    an active laser medium;
    wherein the total reflective mirror, the output mirror, and the discharge lamp define a resonant cavity, and the active laser medium is filled in the resonant cavity.

20. The laser as claimed in claim 19, wherein, the metal film has a second reflective surface and the at least one microstructure protrudes from the second reflective surface, and the at least one microstructure and the metal film are made of a same material and formed as one piece.

* * * * *